(12) United States Patent
Law et al.

(10) Patent No.: US 8,230,992 B2
(45) Date of Patent: Jul. 31, 2012

(54) TABLET COMPUTER CASE FOR MULTIPLE VIEWING ORIENTATIONS

(75) Inventors: David John Law, Seattle, WA (US); Ryan Hill Mongan, Orange, CA (US)

(73) Assignee: Speculative Product Design, LLC, Palo Alto, CA (US)

( * ) Notice: Subject to any disclaimer, the term of this patent is extended or adjusted under 35 U.S.C. 154(b) by 0 days.

(21) Appl. No.: 12/973,007

(22) Filed: Dec. 20, 2010

(65) Prior Publication Data

US 2011/0221319 A1    Sep. 15, 2011

Related U.S. Application Data

(60) Provisional application No. 61/340,143, filed on Mar. 15, 2010.

(51) Int. Cl.
*B65D 85/00* (2006.01)
*F16M 11/00* (2006.01)

(52) U.S. Cl. .............. 206/320; 248/176.1; 248/458; 248/918

(58) Field of Classification Search .......... 206/305, 206/320; 248/176.1, 917–923, 458; 361/679.02, 361/679.05, 679.06, 679.07, 679.27, 679.55, 361/679.56
See application file for complete search history.

(56) References Cited

U.S. PATENT DOCUMENTS

| | | | | |
|---|---|---|---|---|
| 5,100,098 A | * | 3/1992 | Hawkins | 361/679.55 |
| 5,607,054 A | * | 3/1997 | Hollingsworth | 206/320 |
| 5,629,833 A | * | 5/1997 | Ido et al. | 361/679.27 |
| 6,256,193 B1 | * | 7/2001 | Janik et al. | 248/922 |
| 6,522,529 B1 | * | 2/2003 | Huilgol et al. | 248/919 |
| 7,082,028 B2 | * | 7/2006 | Huilgol et al. | 361/679.07 |
| 7,281,698 B2 | * | 10/2007 | Patterson, Jr. | 206/756 |
| 7,708,240 B2 | * | 5/2010 | Homer et al. | 248/919 |
| 7,775,356 B2 | * | 8/2010 | Palmer | 206/320 |
| 2010/0219320 A1 | * | 9/2010 | Knych | 248/176.1 |

* cited by examiner

*Primary Examiner* — Bryon Gehman
(74) *Attorney, Agent, or Firm* — SNR Denton US LLP (57) ABSTRACT

A case or cover for an electronic device such as a tablet computer is disclosed. This case allows the user to protect and personalize their tablet computer. The case allows the user to position the device for viewing in either portrait or landscape mode and does not require the user to hold the device in the desired orientation. The case may have a distinct hinge, with a stop that limits its rotational travel allowing the user to prop the electronic device up, at a desired viewing angle.

8 Claims, 14 Drawing Sheets

TABLET COMPUTER CASE FOR MULTIPLE VIEWING ORIENTATIONS

RELATED APPLICATIONS

The current application is related to (continuation of) a prior provisional application Ser. No. 61/340,143, filed on Mar. 15, 2010, with the same inventors, assignee, and title, taking benefits of all teachings and earlier filing date of that application.

BACKGROUND OF THE INVENTION

Tablet computers have been on the market for quite some time but are making resurgence with models such as the Amazon Kindle, Apple iPad, and Barnes and Noble Nook. One embodiment of this invention describes a case (otherwise known as a sleeve, holder, portfolio, jacket, or shell) for an electronic device such as a tablet computer.

This case allows the user to protect and personalize their tablet computer. This case has the unique property of allowing the user to position the device for viewing in either portrait or landscape mode. This is an increasing useful function as media (such as videos) are engaging the users for longer periods of time. This case does not require the user to hold the device in the desired orientation.

Cases for tablet computers have been available for some time. They are most commonly used to protect the device and allow the user some amount of personalization. Typically, these cases have been fabricated from a soft flexible material, such as leather, synthetic leather, or a polymer-based fabric (e.g. nylon, polyester, or polymer-coated cotton). The functional advantage of the flexible materials is that they can accommodate a hinge without a separate part. The material itself flexes accomplishing the opening and closing action. This allows the user to take the front cover of the case and fold it around the device so that it is adjacent to the back of the device.

SUMMARY OF THE INVENTION

Figure 1A:
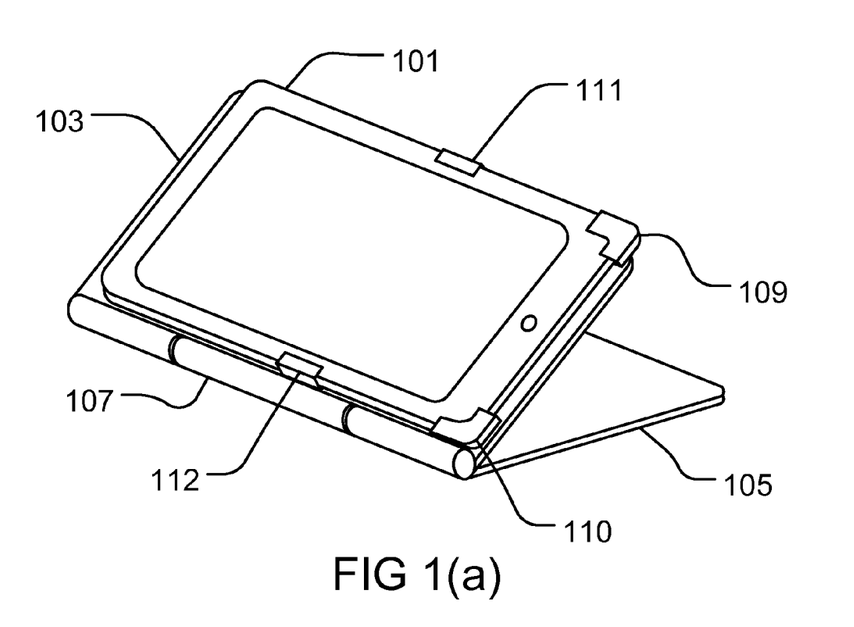
Figure 1B:
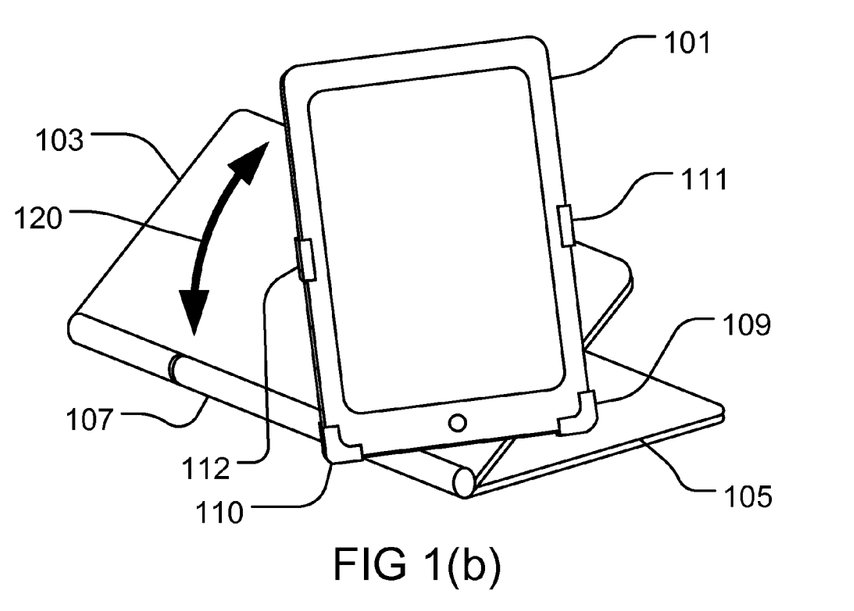
Figure 1C:
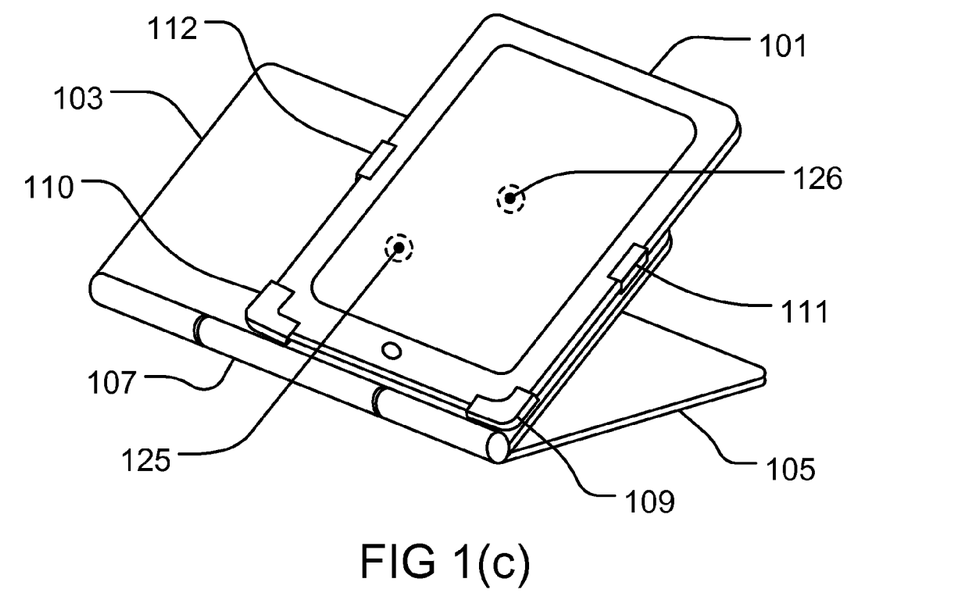
Figure 1D:
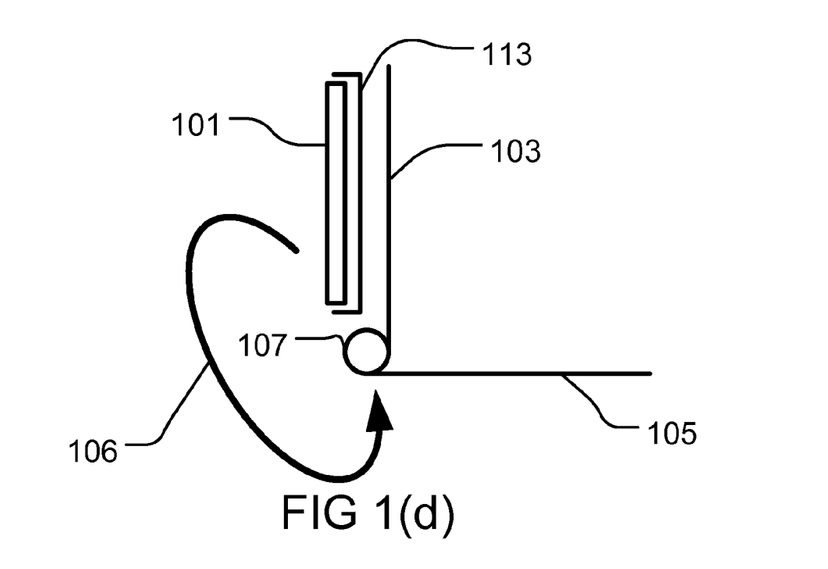

This invention uses a distinct hinge (FIG. 1d, item 107). This hinge can have a stop that limits its rotational travel allowing the user to prop the tablet computer up, at a viewing angle. Alternatively, this hinge can be similar to those used in conventional laptop computers where the display is attached to the base of the laptop. These hinges are known as friction hinges and hold their rotational position until excessive force is used to overcome them.

In another alternative, this friction hinge can have an angular zone of travel where little or no friction is encountered. The friction engages after opening the cover (FIG. 1d, item 105) roughly 280 degrees (106). Then there is roughly 80 degrees of positioning where the tablet computer's position will be held by the hinge.

Other variations of the case, jacket, or holder are also discussed here.

BRIEF DESCRIPTION OF THE DRAWINGS

FIGS. 1 a-d show one set up for holding the device or gadget (laptop, computer, or computing/communication device), for portrait and landscape positions.

FIGS. 2 a-b show another set up for holding the device or gadget, with issues hitting the hinge, if it is done with straight rotation.

FIGS. 3 a-c show another set up for holding the device or gadget, with issues around hinge geometry.

FIGS. 4 a-f show another set up for holding the device or gadget, with slots to allow non-diametric rotation, and 4-bar with tracks.

FIGS. 5 a-e show another set up for holding the device or gadget, with rotation using 4-bar linkage (displaying landscape and vertical orientations).

FIGS. 6 a-h show another set up for holding the device or gadget, with different positions in space, relative to each other.

FIGS. 7 a-b show another set up for holding the device or gadget, with hinges around short axis.

FIGS. 8 a-g show another set up for holding the device or gadget, at different orientations.

DETAILED DESCRIPTION OF THE PREFERRED EMBODIMENTS

The unique nature of this invention is that it allows the user to view the screen of the tablet computer in either the portrait or landscape mode without holding the device (FIG. 1a-c). The assembly is comprised of the tablet computer (FIG. 1d item 101), a holder (FIG. 1d item 113), a back case (FIG. 1d item 103), a hinge (FIG. 1d item 107), and a cover (FIG. 1d item 105), as one embodiment. The holder and the back case move with respect to one another. The embodiment shown in FIG. 1 is a simple rotational movement, as an example.

Figure 2A:
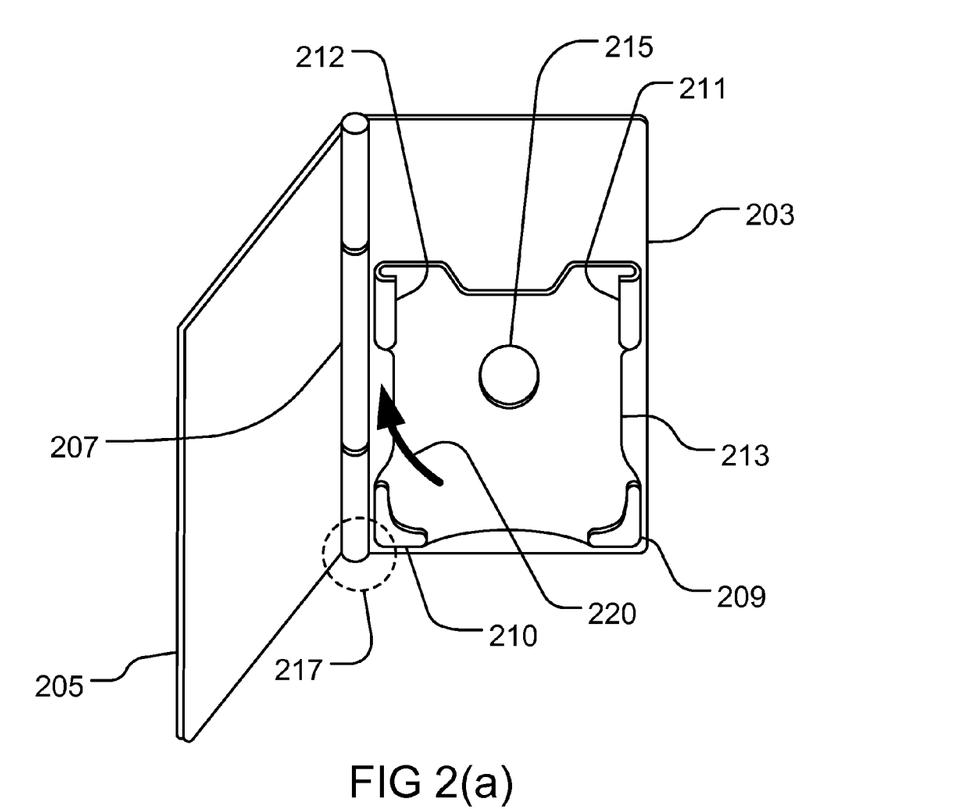
Figure 3A:
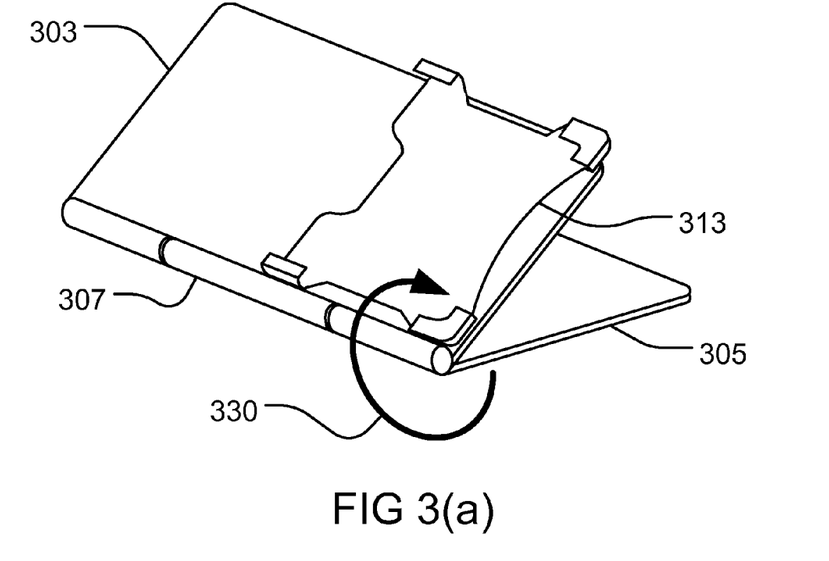

While it is unique, one issue with the simple rotation is that the corner of the tablet computer sweeps out an angle that may interfere with the hinge or with the table top on which the tablet computer is sitting (FIG. 2(a) item 217 and FIG. 3(a) item 330). A solution which may partially solve this user objection is shown in FIG. 3(c). Shown in this side view, the hinge geometry is constructed such that the bulk of the hinge lies below the plane in which the tablet computer rotates.

Another class of solutions which solve the simple rotation issue described above is one which employs a different type of holder motion. FIG. 4 shows an assembly which allows for non-diametric rotation (or rotation coupled with translation). Slots or tracks can exist in the back case (with travel protrusions (or extensions/pins/rails/cavity/channel/path) in the holder). These tracks define the motion of the tablet computer during viewing orientation changes.

Figure 4A:
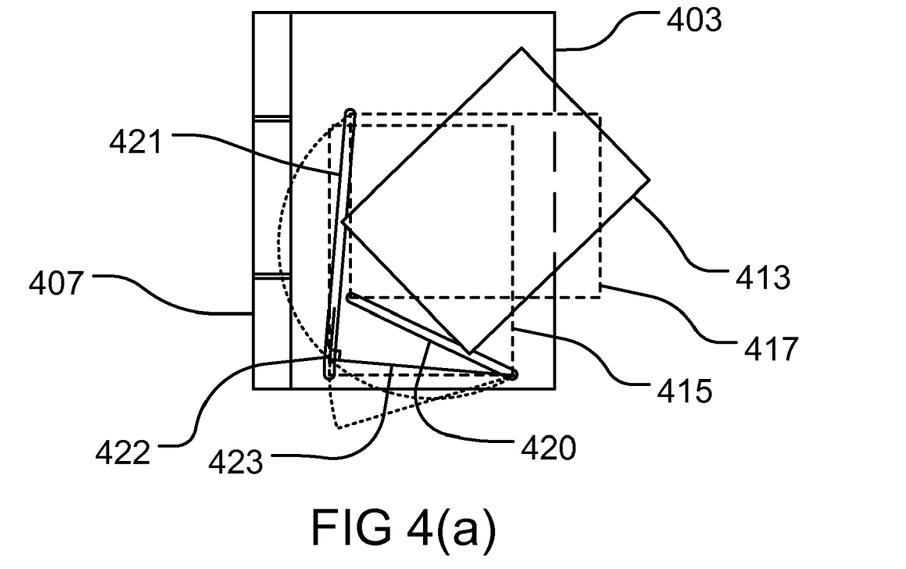
Figure 5A:
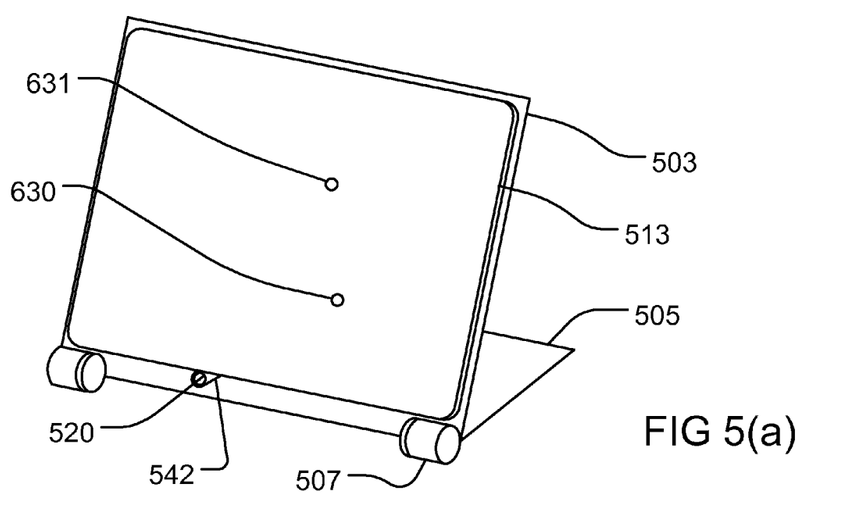
Figure 5B:
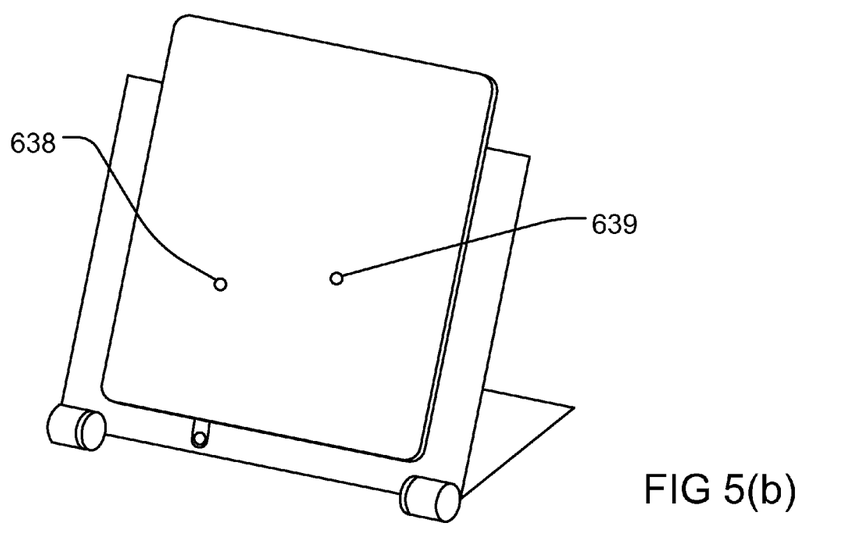
Figures 5C, 5D, 5E:
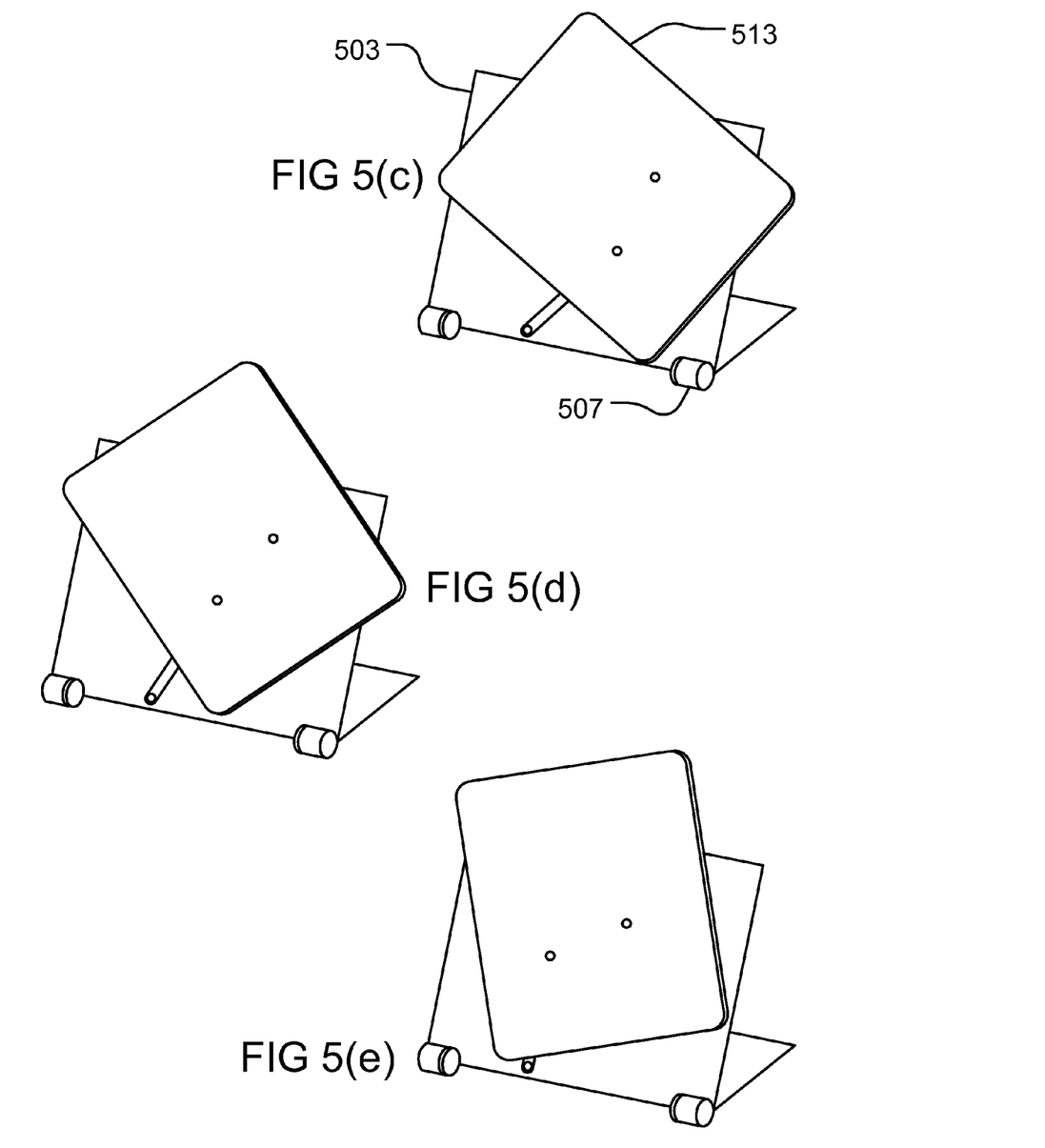
Figure 6A:
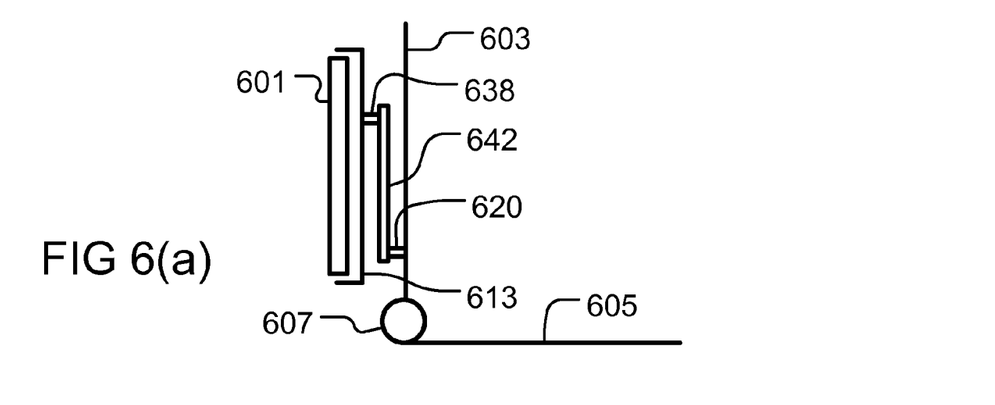
Figure 6B:
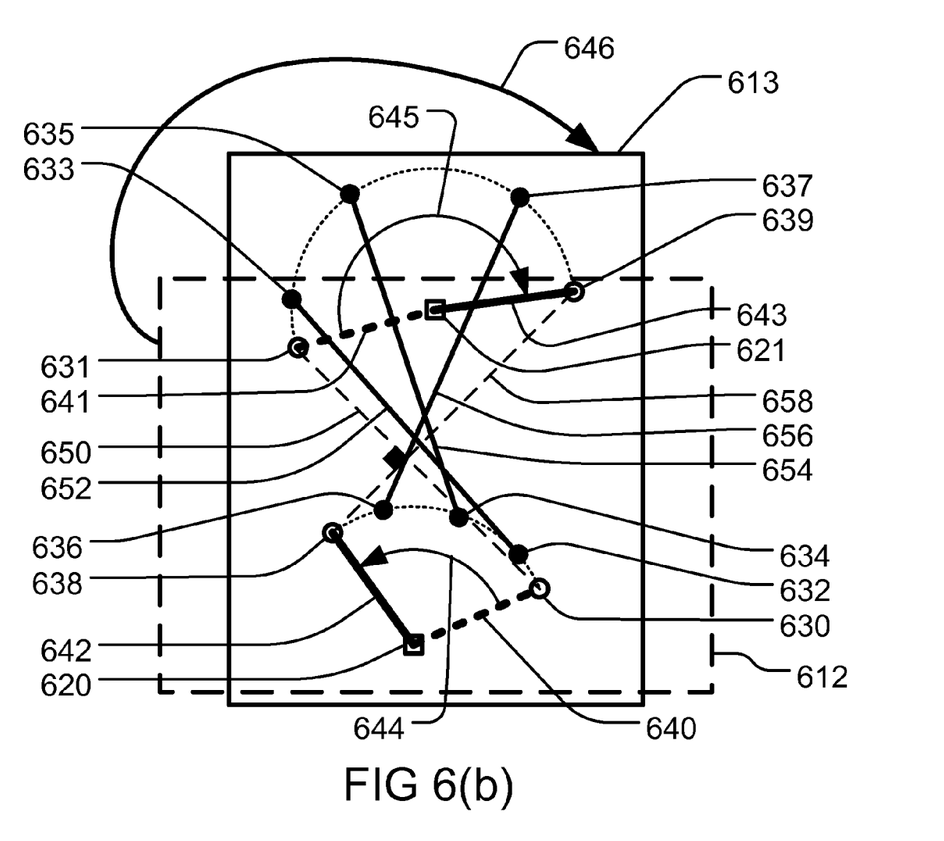
Figure 6C:
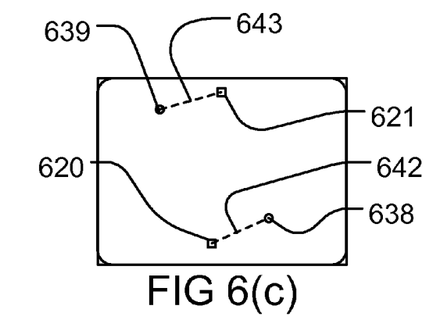
Figure 6D:
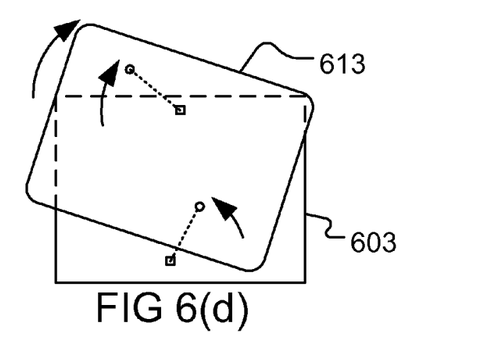
Figure 6E:
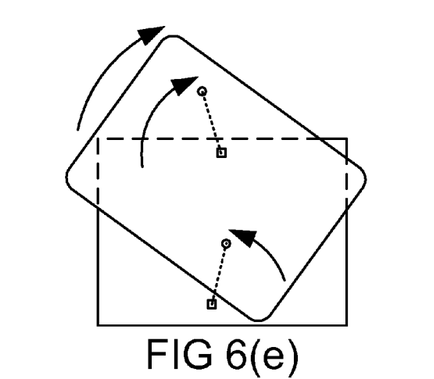
Figure 6F:
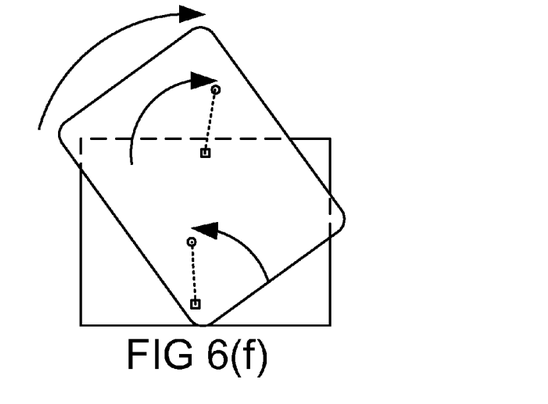
Figure 6G:
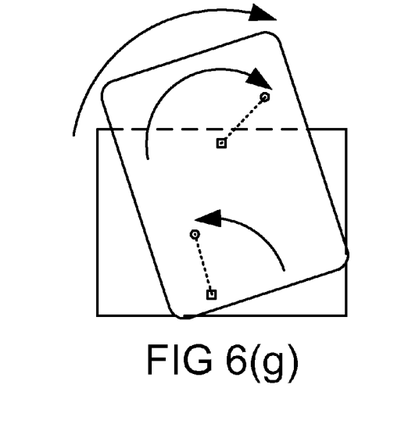
Figure 6H:
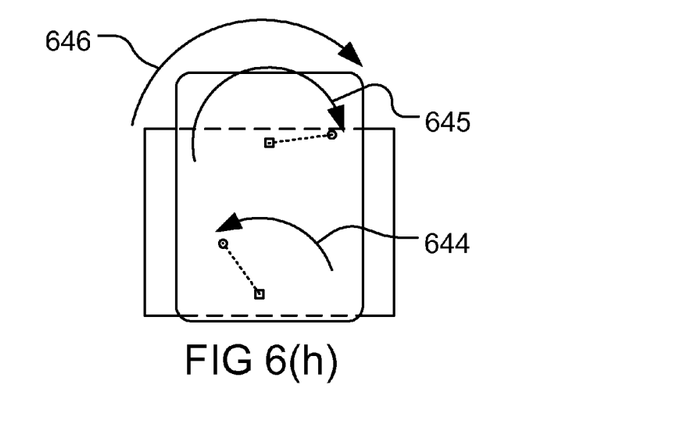

When the tablet computer in FIG. 4a has been successfully rotated to the portrait mode (417), it will look identical to the configuration in FIG. 1c with the added optional benefit that the tablet computer can be centered on the case. This is an improvement both in visual cosmetics and in stability. When centered in portrait mode, the unit is less likely to tip over. This is also possible using non-diametric rotation. Two embodiments are discussed below:

a) The first solution is similar to FIG. 4, in that it uses protrusions in the holder riding within tracks in the back case. In this embodiment, the tracks are not linear (FIG. 8). The tracks have a geometry which allows the tablet computer to be centered after rotation. There are protrusions on the holder. These protrusions are shown in FIG. 8, on the back of item 813. The dashed lines in FIGS. 8(b-g) represent the tracks in the back case, in which these protrusions run. This allows for a very simple mechanism with a desirable movement.

b) The second solution accomplishes the same movement using a four-bar linkage, which is well-known in the art (FIG. 5). This mechanism has more moving parts than solution (a) above, but it is also not prone to binding. The materials in solution (a) above need to be dimensionally stable to ensure the rotation occurring smoothly over many cycles. Since it only has rotational movement, the four-bar linkage does not have the same wear issues as protrusions running in slots and can act repeatedly over many cycles.

FIGS. 6(*a-h*) further describe this second solution utilizing a four-bar linkage. In this solution there are two simple pivoting links between the holder and the back case (FIG. 6*b*, item 642). One end of each link is attached to the holder, and the other end is attached to the back case. A functional embodiment of this solution is shown in FIG. 6. The dashed lines represent the linkages. There is the attachment point of one end of each link in the holder, plus the attachment point of the opposite end of each link in the back case. All four pivots are free to rotate. It is likely the rotation angle will be limited to keep the rotation of the tablet computer to 90 degrees. In the embodiment shown, the links are in the same plane, and thus, allow for a thin assembly. It would also be possible to have the links be in parallel planes to enable the use of longer links.

Figure 7A:
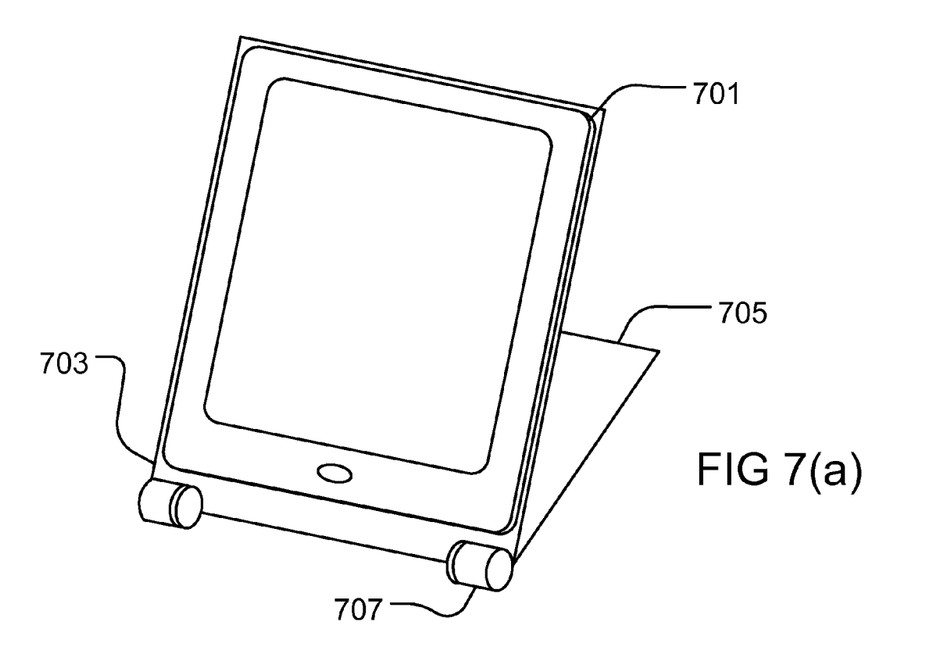
Figure 7B:
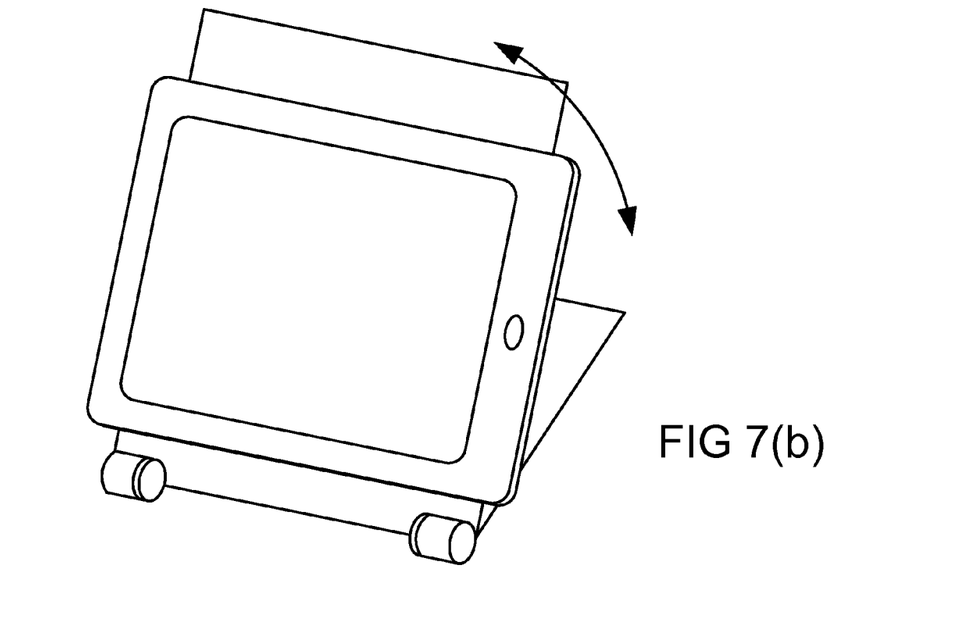

The preceding description was predicated on solutions for rectangular tablet computers. Of course, square form factor tablet computer could also be accommodated, as a special case of a rectangle. In addition, the preceding description assumed that the hinge on the case would occur on the longer of the two sides. Instead, the hinge could exist on the shorter of the sides (FIG. 7), and all the above solutions would still be valid, as another embodiment.

The case may have one or more layers. One can use glue, screw, pin, small bar, or spring, to attach the layers together.

The material used for case can be selected from the following list (or their combinations): plastic, elastic material, rubber, any artificial material, rigid, soft, flexible, wood, glass, mirror, smooth, rough, coarse material or surface, metal, alloy, nylon, cotton, wool, fabric, natural material, transparent, translucent, opaque material, and uniform or non-uniform surface.

A spring or elastic band can be used to hold or adjust the position of the device or cover or stand or jacket or casing. Alternatively, it can be used to bring the object to the original position, based on the user's preference.

FIGS. 1 *a-d* show the position of the tablet computer or device with respect to the case, from different viewpoints, with the following features:
- 101: Mobile device (e.g., PDA, tablet, or cell phone)
- 103: back case
- 105: cover
- 107: hinge
- 109, 110, 111, 112: holder tabs or extensions for holding the mobile device at its sides and/or corners.
- 120: Rotation of the holder.
- 125, 126: notches, groves, or bumps on holder and/or back case, to snap and click the holder to the back case, in portrait and/or landscape orientations, as the holder rotates.
- 113: holder with tabs or extensions.

Figure 2B:
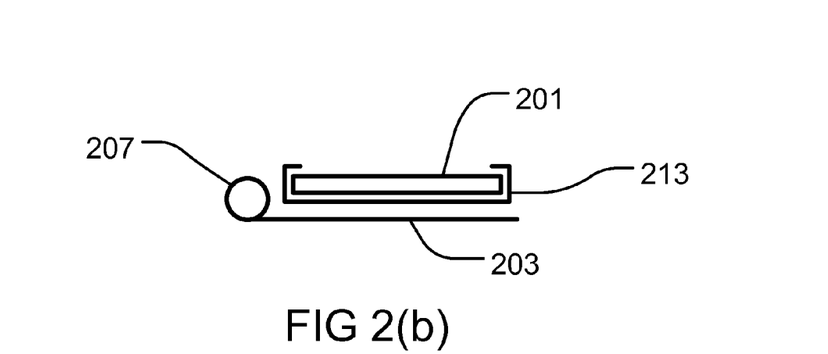

FIG. 2 shows the position of the tablet computer or device with respect to the case, from different viewpoints, with the following features:
- 203: back case
- 205: cover
- 207: hinge
- 209, 210, 211, 212: holder tabs or extensions for holding the mobile device at its sides and/or corners.
- 213: Holder
- 215: Rotation coupling between holder and back case.
- 217: Holder hitting the hinge, if it is a straight rotation.
- 220: Rotation of the holder.
- 201: Mobile device (e.g., PDA, tablet, or cell phone).

Figure 3B:
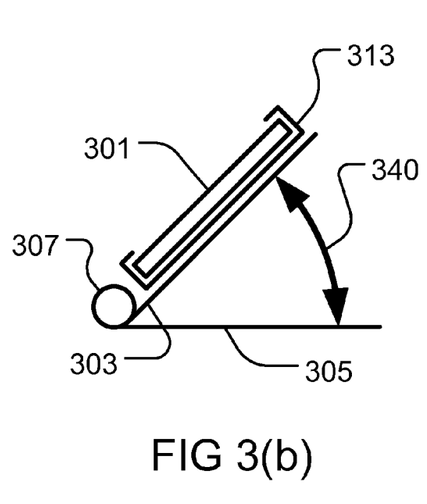
Figure 3C:
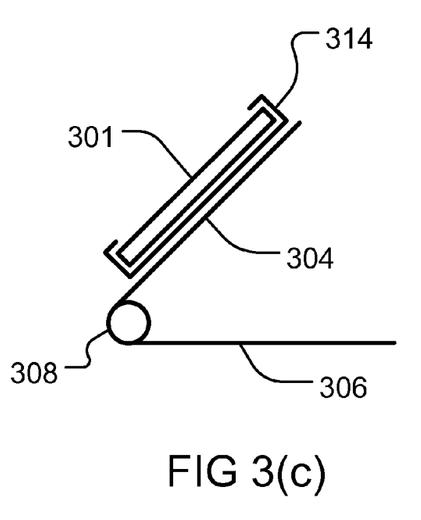

FIG. 3 shows the position of the tablet computer or device with respect to the case, from different viewpoints, with the following features:
- 303: back case
- 305: cover
- 307: hinge
- 313: Holder
- 330: Rotation of back case and cover on hinge, e.g., for about the first 280 degrees, with less friction (loose) or not self-positionable or non-locking
- 301: Mobile device (e.g., PDA, tablet, or cell phone)
- 340: Positionable range (e.g., 80 degrees).
- 304: back case
- 306: cover
- 308: hinge (different geometry, with respect to the cover and back case)
- 314: Holder.

FIG. 4 shows the position of the tablet computer or device with respect to the case, from different viewpoints, with the following features:
- 403: back case
- 407: hinge
- 413: Holder, or also a fitted Mobile device (e.g., PDA, tablet, cell phone).
- 415 and 417: extend of the holder positions, when transitioning the orientation of the holder with respect to the back case.
- 420, 421: a plurality of tracks, slots, or guides on the back case for guiding the movement of the holder, when transitioning between different orientations (e.g., 415 and 417).

Corresponding pins, stubs, or wheels attached to the holder (413) connect and run along or inside tracks, slots, or guides. In one embodiment, two such pins, stubs, or wheels are used on the holder to constraint the path of the holder when transitioning between the orientations. In one embodiment, the pins, stubs, or wheels guided through tracks, slots, or guides keep the holder from separating from the back case (403) in normal operation.

In one embodiment, a track, slot, or guide may be straight (e.g., 420). In one embodiment, a track, slot, or guide (e.g., 421) may have portions of straight and/or curved sections. In one embodiment, a change from curved to straight portions (e.g., at 422) of a track, slot, or guide (e.g., 421) accommodates the smooth movement of the holder (413) and reduces jamming or locking. For example, as shown in FIG. 4(*a*), the portion of track, slot, or guide (421) below change location (422), has substantially a curved (e.g., circular) form, to let the holder rotate clockwise when moving from position 415, as shown by dotted line centered about the bottom right corner of 415.

In one embodiment, the changed location may be geometrically determined by tracing the movement of the holder and identifying potential jamming position. For example, as shown in FIG. 4(*a*), the change location (422) is the closest point on 421 to the bottom right corner of 415, i.e., line 423 is locally perpendicular to 421, with the length about equal to bottom side of 415.

In an embodiment, e.g., as illustrated in FIG. 4(*b*), plurality of tracks, slots, or guides (e.g., 430 and 431) compromise substantially of straight portions. In one embodiment, a track, slot, or guide (e.g., 430) has a bent or locking position at the end (e.g., 433) to provide more stability to the holder (417), when reaching the corresponding orientation (e.g., 417). For example, in such a position, minor jolts to the holder will not tend to dislodge the holder from its location. In one embodiment, as illustrated in FIG. 4(*b*), the combination of gravity and a track, slot, or guide (e.g., 431) direction (e.g., vertical direction) provides such stability (for example) at orientation 415, i.e., minor jolts to the holder, that dislodges the holder from 415 position, would return the holder back to 415 position by gravity.

Figure 4B:
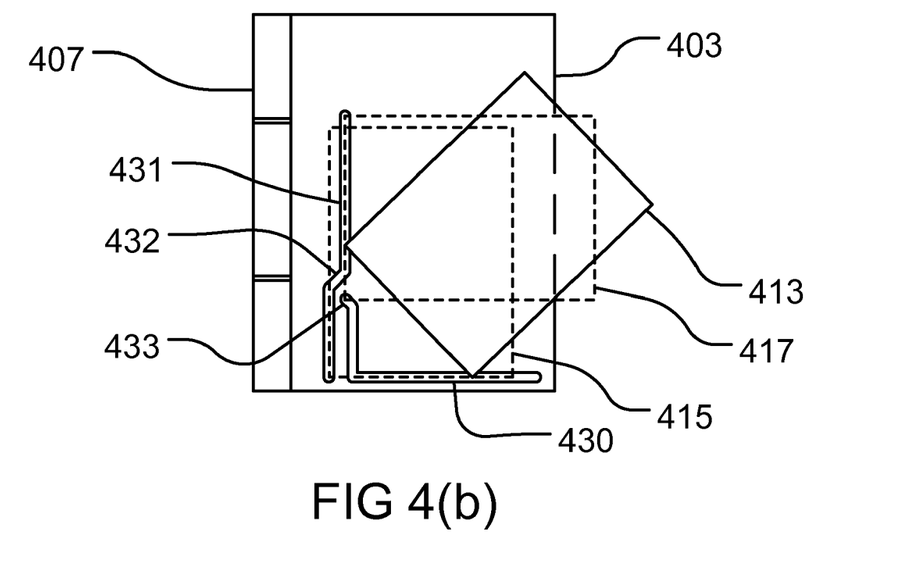

In one embodiment, the angle of a portion of track, slot, or guide (e.g., 432) provides for smooth movement of the holder when transitioning between its orientations. For example, when the holder (413) is at 432, during its transition from 415 to 417, the angle between 432 and the bottom side of 413 is less than 90 degrees, to avoid backtracking of holder on 430, i.e., as holder is passing 432, its lower right corner continues moving from right to left.

Figure 4C:
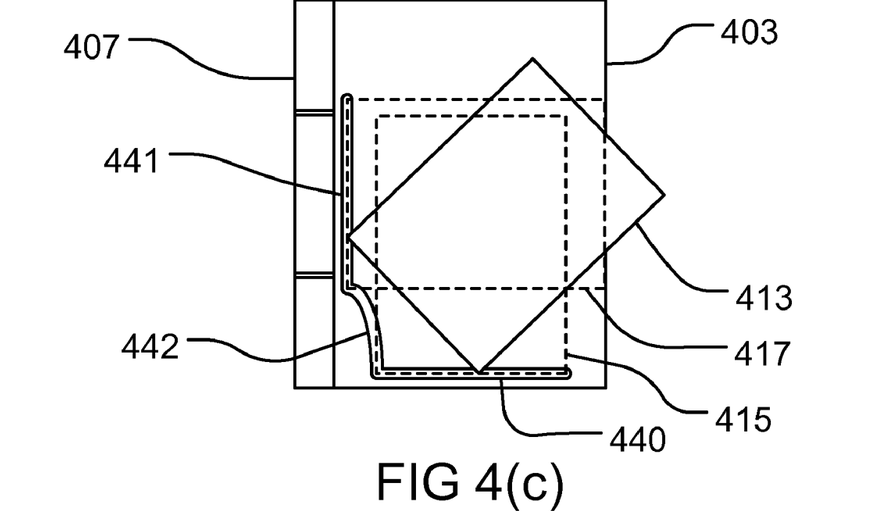
Figure 4D:
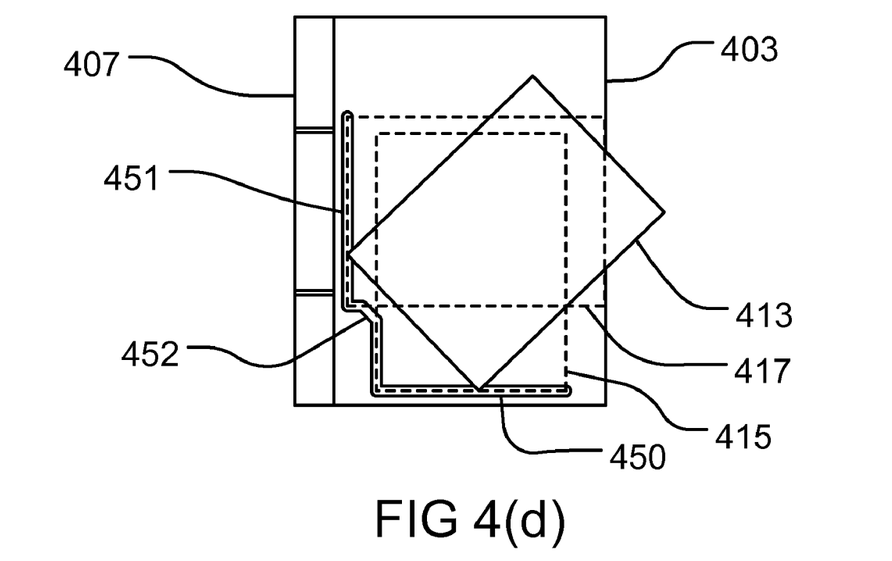

In an embodiment, e.g., as shown for example in FIGS. 4(c)-(d), a single track, slot, or guide is used to guide the movement of the holder (403), while transitioning between its orientation (e.g., 415 and 417). In one embodiment, the shape of track(s), slot(s), or guide(s) is/are determined by tracing the location of pins, stubs, or wheels attached to the holder (413). As illustrated in FIG. 4(c), in an embodiment, a track has end portions (440 and 441) that are substantially straight and a curved portion (442) between the straight portions that allow for smooth transition of holder between its orientations.

In one embodiment, as illustrated in FIG. 4(d), the transitioning portions comprises of one or more linear sub-portions (452). In an embodiment, as illustrated in both FIG. 4(c)-(d), the straight portions are fitted to the location of pins, stubs, or wheels on the holder, to provide stability at various holder orientations (415, 417), such that jolts to the holder in those orientations will not dislodge the holder, or will return the holder to the original orientation position.

In one embodiment, one or more spring loaded, a flexible locking mechanism(s), or a friction-based locking mechanism hold(s) the holder, or one or more pin(s), stub(s), or wheel(s) on the holder, at its/their location(s), when the holder has reached the desired orientations.

Figure 4E:
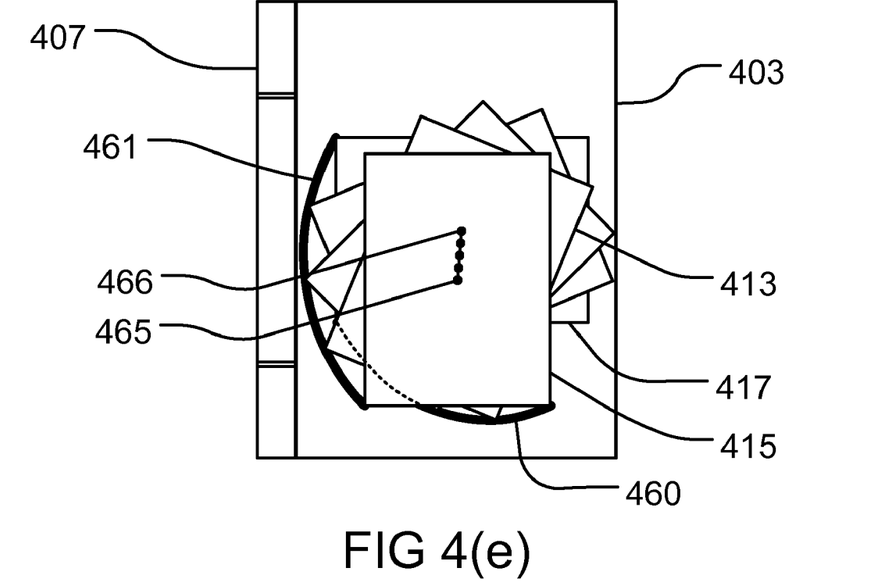
Figure 4F:
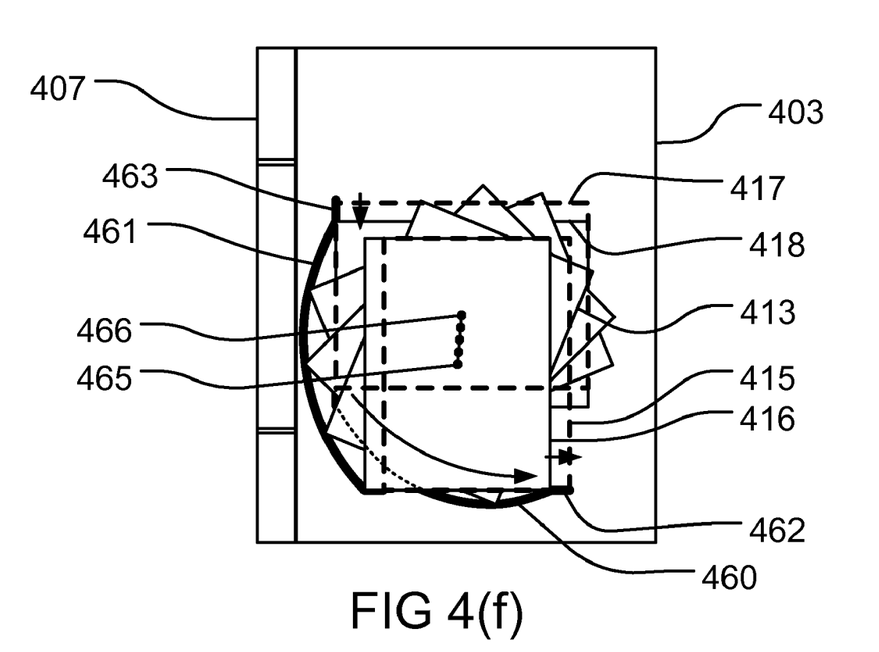

In an embodiment, e.g., as shown for example in FIGS. 4(e)-(f), a plurality of tracks, slots, or guides are used to smoothly guide the movement of the holder (403) between its orientations (415 and 417).

In one embodiment, as illustrated in FIG. 4(e), a center point of the holder (or a mobile device) is smoothly traced (for example, from 465 to 466) between the orientations. The traces of the pins, stubs, or wheels attached to the holder provide the location of and path for tracks, slots, or guides (e.g., 460 and 461). In one embodiment, as illustrated in FIG. 4(f), one or more tracks, slots, or wheels are extended (e.g., 462 and 463), to provide more stability to the holder, while it is in the desired orientations. In such an embodiment, the intermediate orientation and position of the holder (e.g., 416 and 418) are used to trace the tracks, slots, or guides (e.g., 462 and 461). Then, the holder is moved to or dislodged from its location at desired orientation (e.g., 417 or 415) from/to an intermediate location (418 or 416, respectively) by a translation.

FIG. 5 shows the position of the tablet computer or device with respect to the case, from different viewpoints, with the following features:
  503: back case
  505: cover
  507: hinge
  513: Holder, or also a fitted Mobile device (e.g., PDA, tablet, cell phone).

In one embodiment, the movement of the holder (513) against the back case (503) is constraint via a linkage mechanism, such as four-bar linkage (which provides one degree of freedom of planar movement). In one embodiment, linkages are formed between the back case (503) and the holder (513) via slider tracks and/or pivoting pins (e.g., 520, 630, and 631) and bars (e.g., 542). In addition, limiters on slider tracks or stoppers (on bars or pivot points) help center the mobile device at the desired orientations (e.g., see FIGS. 5(a)-(b)).

FIGS. 5(a)-(b) show two orientations of the holder (513) with respect to the back case (503), in an embodiment, and FIGS. 5(c)-(e) demonstrate intermediate snap shots between these orientations. These figures show the location of holder pins in various orientations (e.g., 630 and 631 in landscape orientation and 638 and 639 in portrait orientation), in an embodiment. They also show one of the back case pins (e.g., 520) and its corresponding bar (540), in an embodiment. FIGS. 6(a)-(h) demonstrate the mechanism in more details.

In one embodiment, as shown in FIGS. 5(a)-(e), short hinges (e.g., 507) between the cover (505) and the back case (503) are located at the ends of the pivoting line between the back case (503) and cover (505). In such embodiments, the hinge does not interfere with the movement of the holder or the mobile device, during the transition between the desired orientations (see e.g., FIG. 5(c)). Such hinge arrangement may be employed in other embodiments as well (e.g., those illustrated via FIGS. 1-8).

FIG. 6 shows the position of the tablet computer or device with respect to the case, from different viewpoints, with the following features:
  603: back case
  605: cover
  607: hinge
  613: Holder
  601: Mobile device (e.g., PDA, tablet, cell phone)
  620: a pivoting pin on back case
  638: a pivoting pin on the holder
  642: a connecting bar between pivoting pins 620 and 638.

In an embodiment, for example, as illustrated in FIGS. 6(b)-(h), a holder (or a fitted mobile device) (613) is transitioned between its orientations from location 612 to location 613. The movement is constraint in one embodiment via a linkage, such as 4-bar linkage. In one embodiment, two pivot points (620 and 621) (and/or sliders) on the back case are connected to two pivot points (638 and 639, respectively) (and/or slider bars) on the holder (613) via two bars (642 and 643, respectively). When, the holder is transitioned (646) from orientation 612 to orientation 613, the bars (642 and 643) move from their initial locations at 640 and 641 (respectively), by rotating (644 and 645, respectively) around the pivoting points 620 and 621 (respectively). The pivot points (638 and 639) on the holder (at the end of the bars) traverse on arcs of circles, during the rotation (e.g., from 630, 632, 634, 636, to 638, and from 631, 633, 635, 637, to 639, respectively).

In one embodiment, the distance between the pivot points 638 and 639 on the holder are fixed and the movement is constrained accordingly, such that the line connecting these pivot points on the holder during the transition maintains its length, i.e., lines 650, 652, 654, 656, and 658 have equal lengths. The location of the pivot points and the pivot limitations in one embodiment are selected so that lines 650 and 658 are perpendicular to each other.

FIG. 7 shows the position of the tablet computer or device with respect to the case, from different viewpoints, with the following features:
  701: Mobile device (e.g., PDA, tablet, cell phone)
  703: back case
  705: cover
  707: hinge.

FIG. 8 shows the position of the tablet computer or device with respect to the case, from different viewpoints, with the following features:

- 801: Mobile device (e.g., PDA, tablet, cell phone)
- 803: back case
- 805: cover
- 807: hinge
- 813: holder
- 820 and 822: pin, stub, or wheel on the holder.
- 821: track, slot, or guide on the back case
- 801: Mobile device (e.g., PDA, tablet, cell phone)
- 803: back case
- 805: cover
- 807: hinge
- 813: holder
- 821 and 823: tracks, slots, or guides on the back case.

Figure 8A:
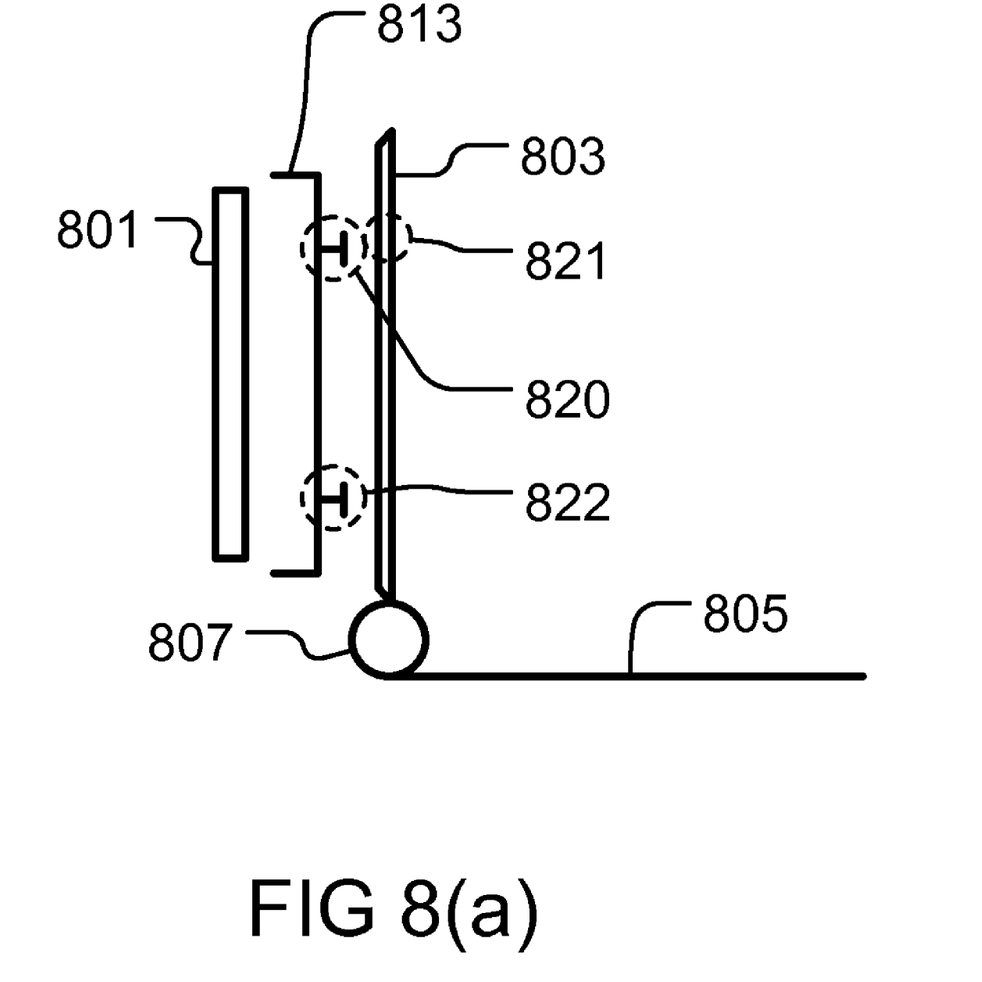
Figure 8B:
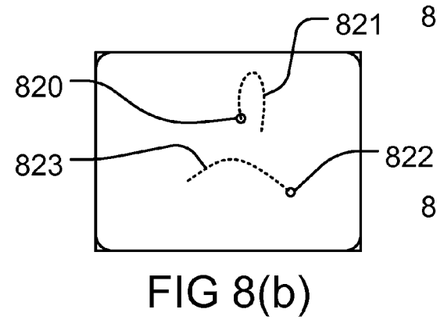
Figure 8C:
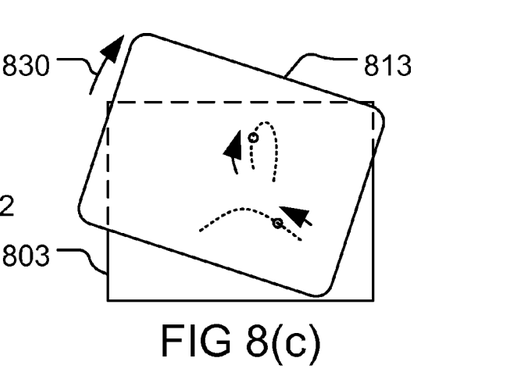
Figure 8D:
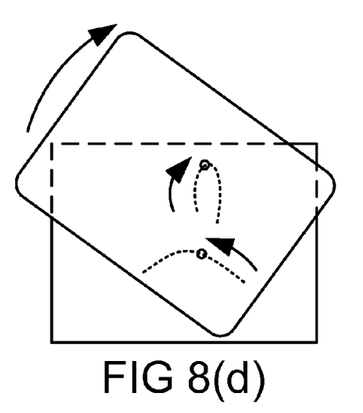
Figure 8E:
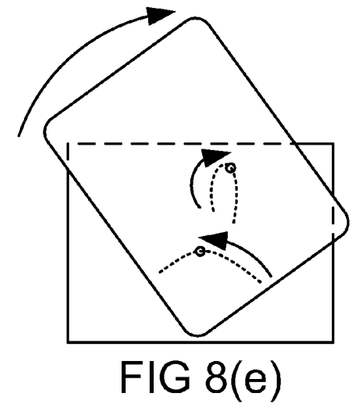
Figure 8F:
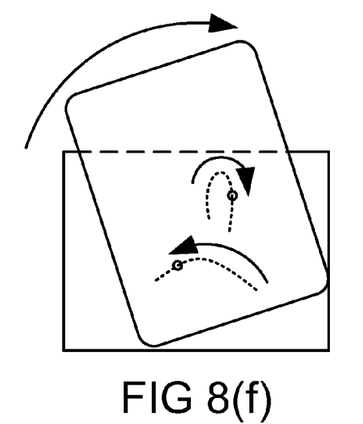
Figure 8G:
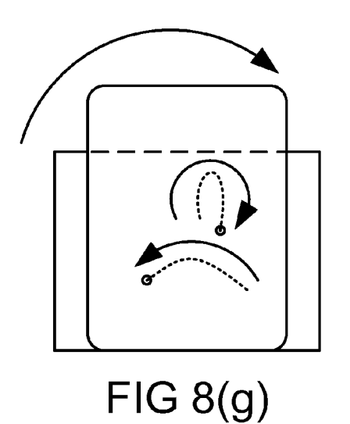

In one embodiment, one or more tracks, slots, or guides constraint the movement of the pins, stubs, or wheels, so that the holder stops at the desired orientations (e.g., see FIGS. 8(b) and 8(g)).

In different embodiments, one can use one or more railings, slots, indentations, notches, pivoting pieces, hinges, or tracks with one or more pins, protrusions, screws, knobs, sticks, bars, or extensions. One can have one or more degrees of freedom in 1, 2, or 3-dimensional space, for movements and rotation/translation, using such tracks and pins. One can use 4 or 5-bar set up for controlling and constraining the movements of one object (such as an electronic gadget/device), with respect to another object/holder/jacket/case. One can use one or more hinges in different shapes and positions. One can use a continuous single hinge (or multiple smaller hinges, but not continuous, to let the other objects occupy the space between the hinges, for the sake of space, convenience, cost, and efficiency).

The theory behind use 4 or 5-bar set up for controlling and constraining the movements of one object (commonly known as "linkage") is described here (source: Wikipedia.org, or any other mechanics/physics text book): The most common linkages have one degree of freedom, meaning that there is one input motion that produces one output motion. Kutzbach-Gruebler's equation is used to calculate the degrees of freedom of linkages. The number of degrees of freedom of a linkage is also called its mobility. A simplified version of the Kutzbach-Gruebler's equation for planar linkages is shown below:

$$m=3(n-1)-2f$$

where m, n, and f are defined as:
- m=mobility=degrees of freedom
- n=number of links (including a single ground link)
- f=number of one-degree-of-freedom kinematic pairs (pin or slider joints)

Any variations of the above teaching are also intended to be covered by this patent application.

The invention claimed is:

1. A case for a tablet-computing device, said case comprising:
   a first cover portion shaped to cover a first surface of the tablet-computing device
   a second cover portion shaped to cover a second surface of the tablet-computing device;
   a holder mounted to the first cover portion, for securing the tablet-computing device to the cover portion, and
   a hinge,
      wherein the first cover portion and the second cover portion are connected by the hinge, and where the second cover portion can be positioned as a stand relative to the first cover portion, and
      wherein the holder as mounted to the first cover portion can be repositioned and rotated relative to the first cover portion.

2. The case of claim 1, wherein said first cover portion comprises a plurality of railings or grooves, and
   wherein the holder moves freely within the plurality of railings or grooves.

3. The case of claim 1, wherein the first cover portion is sized to substantially cover the back of the tablet-computing device and the second cover portion is sized to substantially cover the front of the tablet-computing device.

4. The case of claim 1, wherein said holder has one degree of freedom of mechanical movement relative to the first cover portion.

5. The case of claim 1, wherein said holder has more than one degree of freedom of mechanical movement relative to the first cover portion.

6. The case of claim 1, wherein said holder rotates 90 degrees relative to said first cover portion while maintaining co-planarity with said first cover portion.

7. The case of claim 1, wherein said holder is a non-diametric rotation assembly.

8. The case of claim 1, wherein said first cover portion and said second cover portion comprises one or more of the following: plastic, elastic, metal, fabric, cotton, wool, alloy, mixture, and compound.

* * * * *